US005687700A

United States Patent [19]

Kato

[11] Patent Number: 5,687,700

[45] Date of Patent: Nov. 18, 1997

[54] ENGINE FEEDBACK CONTROL SYSTEM

[75] Inventor: Masahiko Kato, Hamamatsu, Japan

[73] Assignee: Sanshin Kogyo Kabushiki Kaisha, Hamamatsu, Japan

[21] Appl. No.: 545,359

[22] Filed: Oct. 19, 1995

[30] Foreign Application Priority Data

Oct. 21, 1994 [JP] Japan .................................... 6-256589

[51] Int. Cl.[6] .......................... F02D 41/14; G01M 19/00

[52] U.S. Cl. ............................................ 123/688; 73/118.1

[58] Field of Search .................................... 123/479, 688, 123/690; 73/23.32, 118.1

[56] References Cited

U.S. PATENT DOCUMENTS

| | | | |
|---|---|---|---|
| 4,373,187 | 2/1983 | Ishii et al. | 123/674 X |
| 4,980,834 | 12/1990 | Ikeda et al. | 123/688 X |
| 5,020,499 | 6/1991 | Kojima et al. | 123/479 |
| 5,235,957 | 8/1993 | Furuya | 123/688 |
| 5,243,954 | 9/1993 | Moss | 123/688 |
| 5,325,711 | 7/1994 | Hamburg et al. | 73/118.1 |
| 5,370,101 | 12/1994 | Hamburg et al. | 123/688 |
| 5,423,203 | 6/1995 | Namiki et al. | 123/688 X |

FOREIGN PATENT DOCUMENTS

| | | | |
|---|---|---|---|
| 63-71538 | 3/1988 | Japan | 123/688 |
| 63-170539 | 7/1988 | Japan | 123/688 |

*Primary Examiner*—Tony M. Argenbright

*Attorney, Agent, or Firm*—Knobbe, Martens, Olson & Bear LLP

[57] ABSTRACT

A feedback control system for an internal combustion engine that employs a combustion condition sensor for feedback control. The output of the sensor is checked periodically, either by changing the fuel-air ratio and determining if the output changes or by seeing if the output is constant during periods of constant running conditions; and if the sensor is determined to be inaccurate, another control method is employed.

8 Claims, 5 Drawing Sheets

ENGINE FEEDBACK CONTROL SYSTEM

BACKGROUND OF THE INVENTION

This invention relates to an engine control system and method and more particularly to an improved feedback control system and method for maintaining the desired fuel-air ratio in an engine during its running.

As is well known, considerable efforts are being taken to improve the performance of internal combustion engines by more accurate fuel-air ratio control. Such systems employ one of many types of combustion sensors so as to sense the fuel-air ratio during the engine running. The sensed fuel-air ratio is compared with a target ratio for the given engine running conditions, and if it is not within the desired range adjustment is made. These systems obviously offer considerable improvement in engine performance, particularly fuel economy and exhaust emission control.

One of the types of sensors most commonly used for this purpose is an oxygen ($O_2$) sensor. Such sensors are positioned either in the combustion chamber or communicate with the combustion chamber or the exhaust system and, by sensing the amount of oxygen present in the combustion products, can determine the fuel-air ratio in the engine. These sensors normally output a signal that is indicative of either a lean or a rich mixture and have a transitional phase between these mixture strengths, depending upon the ratio of the fuel-air mixture to the ideal or stoichiometric fuel-air ratio.

Although these systems are very effective, they can be improved upon. There are times when the output of the sensor cannot or should not be employed for the fuel-air ratio control. One example of such a condition is when the engine is first being started up and before the sensor may be at its operating temperature. In this regard, it should be noted that these sensors normally do not provide an accurate output signal until they have reached a certain temperature. Hence, during initial warm-up it is not possible to employ effective feedback control.

Although it may be possible to delay the feedback control for a predetermined time period, wherein it will be ensured that the sensor is at its operating condition, such systems must be set on the safe side, and hence under many conditions the engine is run in a non-feedback control condition, even though feedback control would be possible.

A system has been proposed where the mixture is run intentionally rich during start-up for two purposes. The first purpose is to ensure quick warm-up of the sensor. The other purpose is to monitor the output of the sensor, and when it indicates a rich condition, then it is known that the sensor is operating at an operative temperature when feedback control is possible. The switch over to such feedback control is then initiated.

The difficulty with this type of system is that it requires running under a richer than required condition under at least some phases of the operation. Hence, the very purpose that the control is intended to create is defeated, at least momentarily or temporarily.

Because these sensors are positioned in contact with the combustion products of the engine, they can become contaminated. This problem is particularly acute when utilized in conjunction with two-cycle engines, although the problem is not necessarily limited thereto. That is, the output of the sensor may deteriorate as the sensor becomes contaminated, and then the feedback control will be improper and poor performance can result.

It is, therefore, a principal object of this invention to provide an improved control method and engine control system employing feedback control wherein the sensor condition can be determined, and if the condition is not such that feedback control is appropriate, a switch to another control method can be effected.

It is a further object of this invention to provide an improved start-up arrangement for an internal combustion engine wherein the initiation of feedback control can be assured at as early a time as possible without unduly disturbing the fuel-air ratio prior to such time.

It is a further object of this invention to provide an improved method and apparatus whereby the condition of a sensor for engine feedback control can be periodically tested and feedback control discontinued in the event the sensor is determined to be defective or its output not accurate.

It is a yet further object of this invention to provide an improved method and apparatus for determining the condition of a sensor of an engine feedback control system.

SUMMARY OF THE INVENTION

This invention is adapted to be embodied in an internal combustion engine control system and method for maintaining a desired fuel-air ratio. The engine includes a combustion chamber, an air induction system for delivering at least an air charge to the combustion chamber and a charge-forming system for supplying at least a fuel charge to the combustion chamber. An exhaust system is provided for discharging combustion products from the combustion chamber. A combustion condition sensor is provided for sensing the fuel-air ratio in the combustion chamber. A feedback control is provided for receiving the output from the combustion condition sensor and adjusting at least one of the charge-forming and induction systems to maintain the desired fuel-air ratio.

In accordance with an apparatus for practicing the invention, means are provided for comparing the output of the combustion condition sensor with a known condition to determine if the combustion condition sensor is providing an accurate signal.

In accordance with a method of practicing the invention, the output of the combustion condition sensor is periodically compared with a known value to determine if the combustion condition sensor is providing an accurate signal.

DETAILED DESCRIPTION OF THE PREFERRED EMBODIMENTS OF THE INVENTION

Figure 1:
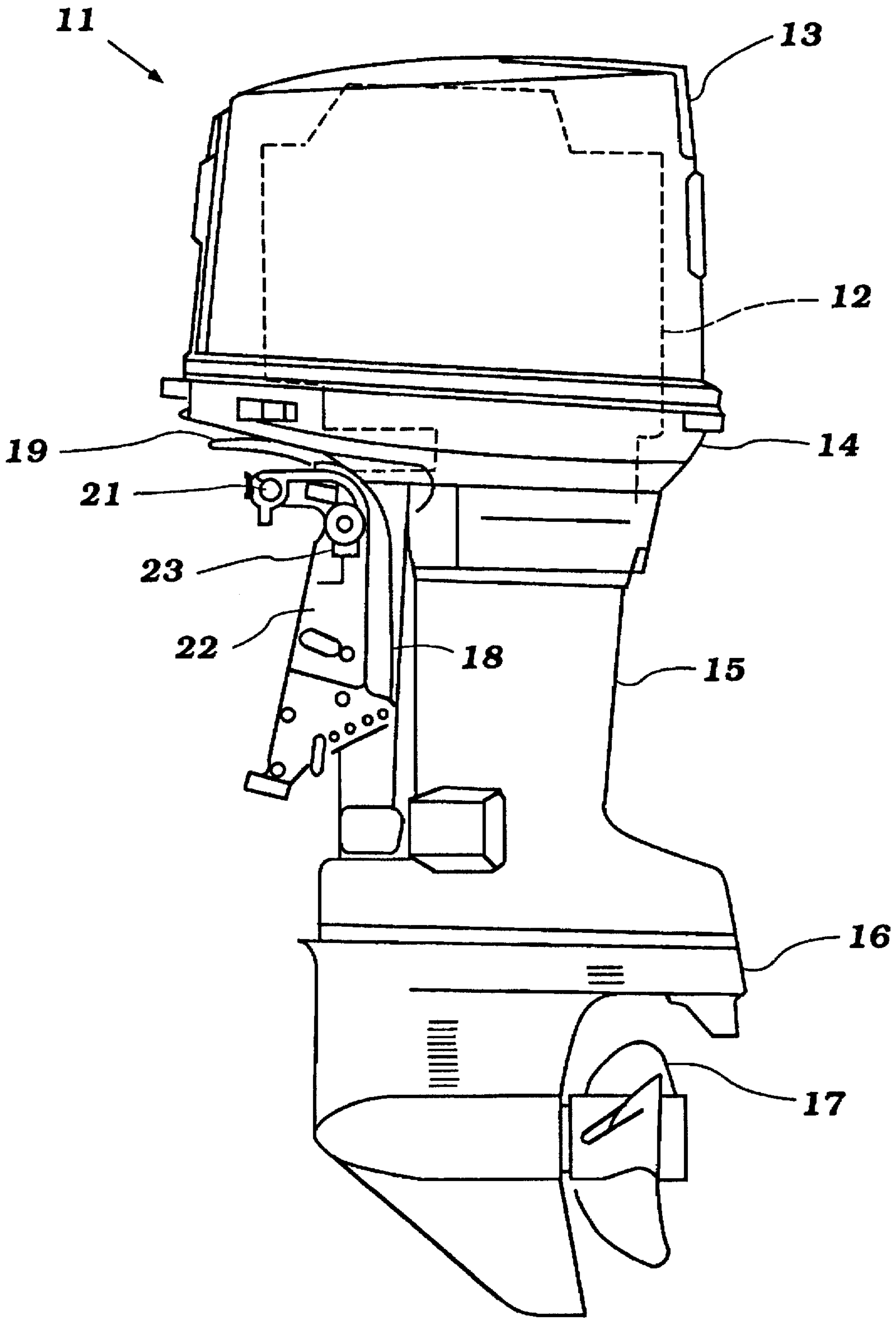
FIG. 1 is a side elevational view of an outboard motor constructed and operated in accordance with an embodiment of the invention.

Referring now in detail to the drawings and initially to FIG. 1, an outboard motor constructed and operated in accordance with the embodiment of the invention is indicated generally by the reference numeral 11. The invention is described in conjunction with an outboard motor because an outboard motor is a typical environment in which the invention may be utilized. It will be readily apparent to those skilled in the art, however, how the invention may be employed with a wide variety of types of engines and engine applications. Therefore, the description of the engine which follows should also be considered as exemplary of one of many types of engines with which the invention may be practiced.

The invention depicted and its application to an outboard motor have been chosen because the invention has particular utility with two-cycle crankcase compression engines. This is the type of engine which will be described, and such engines are frequently employed as the power plants in outboard motors. Again, however, those skilled in the art will readily understand that this is merely for purposes of explanation.

The outboard motor 11 is comprised of a power head that consists primarily of a powering internal combustion engine 12 that is surrounded within a protective cowling that is comprised of a main cowling member 13. This cowling also includes a tray portion 14 which underlies in part the engine 12.

As is typical with outboard motor practice, the engine 12 is supported within the power head so that its output shaft or crankshaft rotates about a generally vertically extending axis. This is done to facilitate connection between the engine output shaft, which will be described later by reference to the remaining figures, and a drive shaft (not shown) that depends into a drive shaft housing 15 that is positioned beneath the power head. This drive shaft continues on and terminates in a lower unit 16 formed at the lower portion of the drive shaft housing 15.

Contained within the lower unit 16 and driven by the drive shaft is a conventional forward/neutral/reverse transmission, which is also not shown. This transmission is coupled to a propeller 17 in a well-known manner so as to permit driving of the propeller 17 in selected forward or reverse directions.

The outboard motor further includes a steering shaft (not shown) which is rotatably journaled within a swivel bracket 18 for steering of the outboard motor 11 about a generally vertically extending steering axis. A tiller 19 is affixed to the upper end of the aforenoted steering shaft and is operated in a known manner for steering of the outboard motor 11 and the associated watercraft.

The swivel bracket 18 is pivotally connected by means of a pivot pin 21 to a clamping bracket 22. The clamping bracket 22 is adapted to be attached to the transom of an associated watercraft in a manner well known in this art. The pivotal movement of the swivel bracket 18 and, accordingly, the major portions of the outboard motor 11 about the pivot pin 21, accommodates both trim adjustment of the angle of attack of the propeller 17 and also movement of the outboard motor to an above-the-water tilted-up position.

A trim position sensor (not shown) is interposed between the swivel bracket 18 and clamping bracket 22 to provide an output signal indicative of the trim condition. This trim signal may be utilized to provide an indication to a remote operator of the watercraft of the trim position and also for various control purposes, including engine control, if desired.

Figure 2:
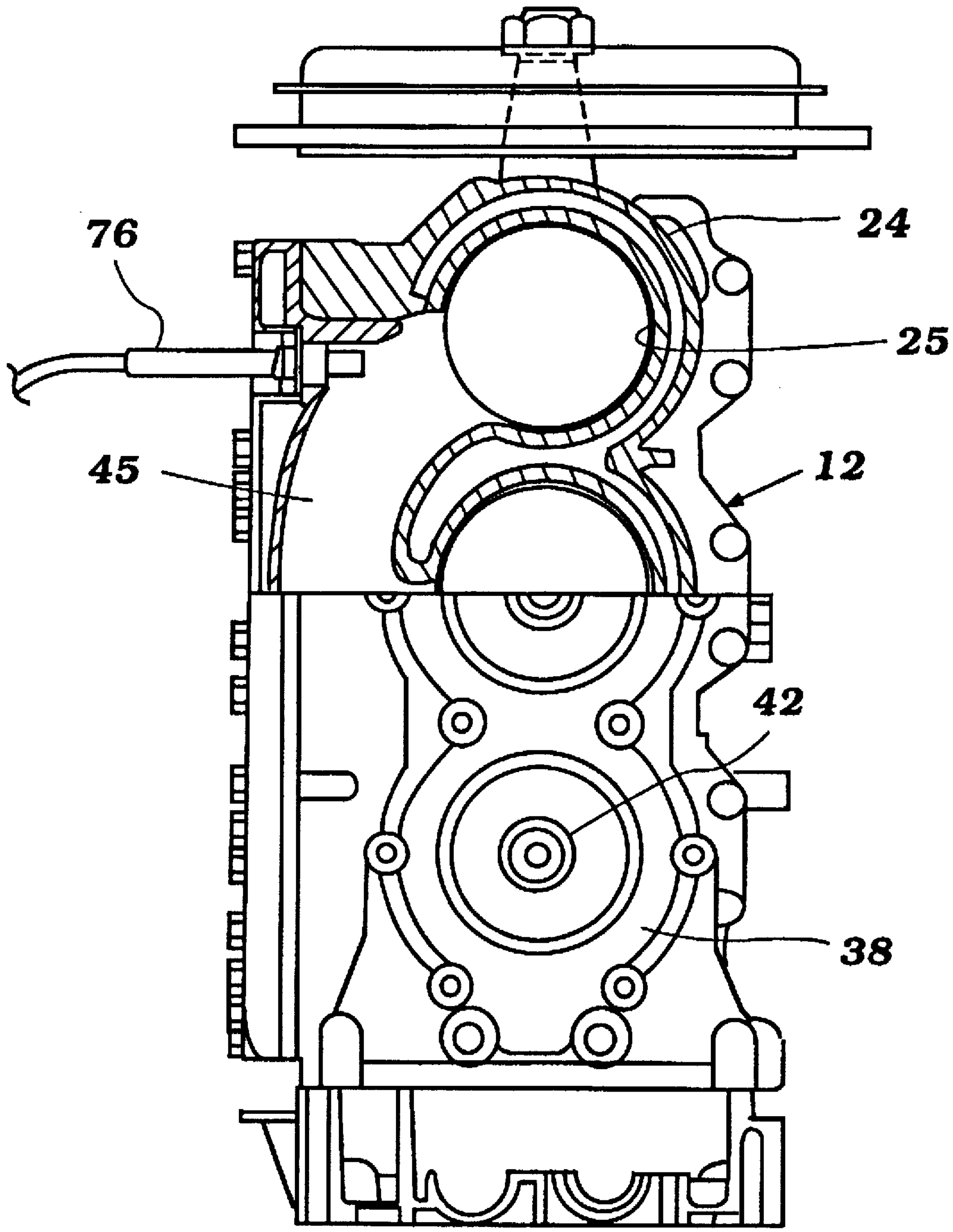
FIG. 2 is a rear elevational view of the engine of the power head, with a portion broken away and shown in section.
Figure 3:
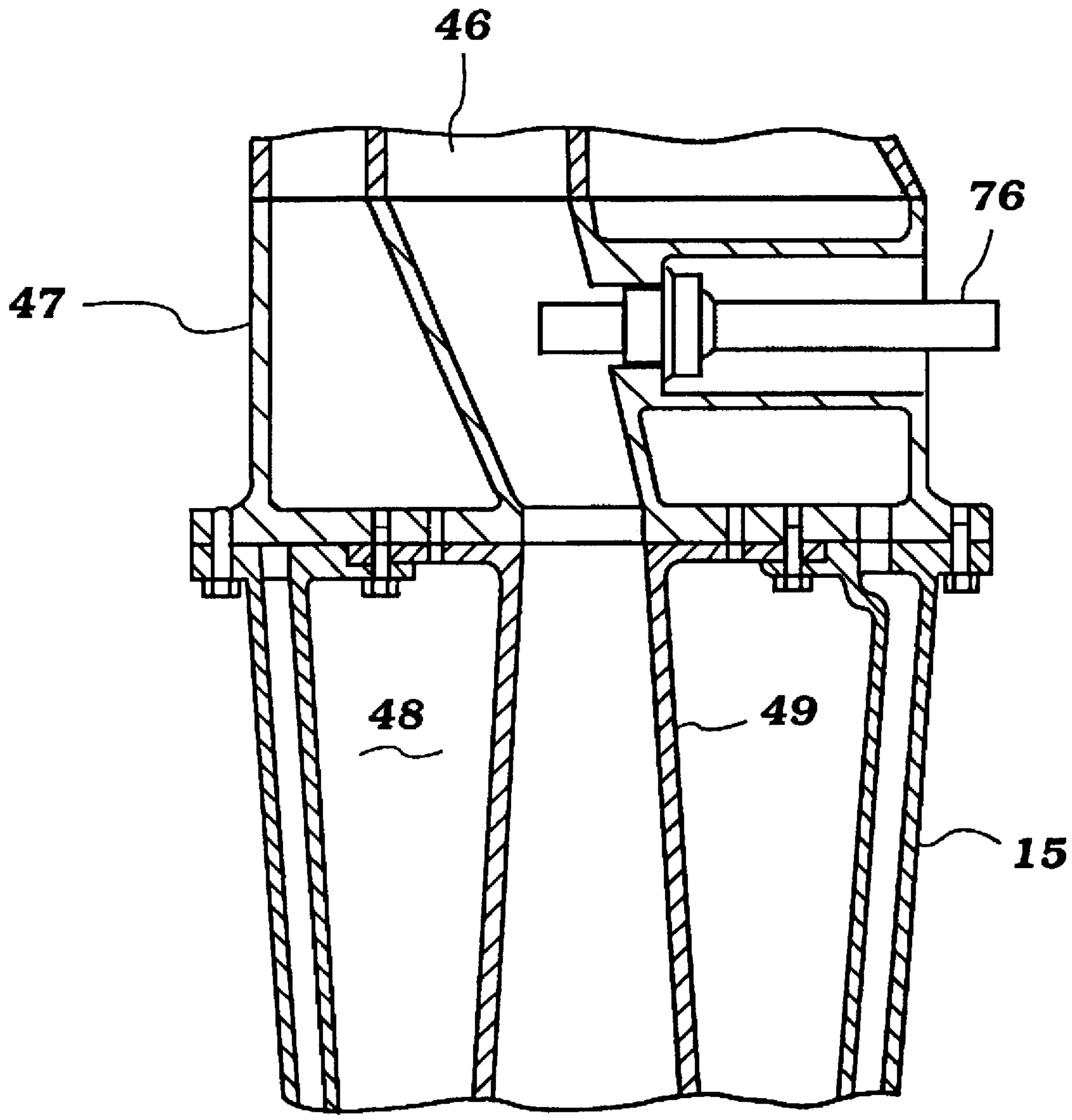
FIG. 3 is an enlarged cross-sectional view showing the area where the power head meets the drive shaft housing and shows the exhaust system and another embodiment in which the sensor is located therein.
Figure 4:
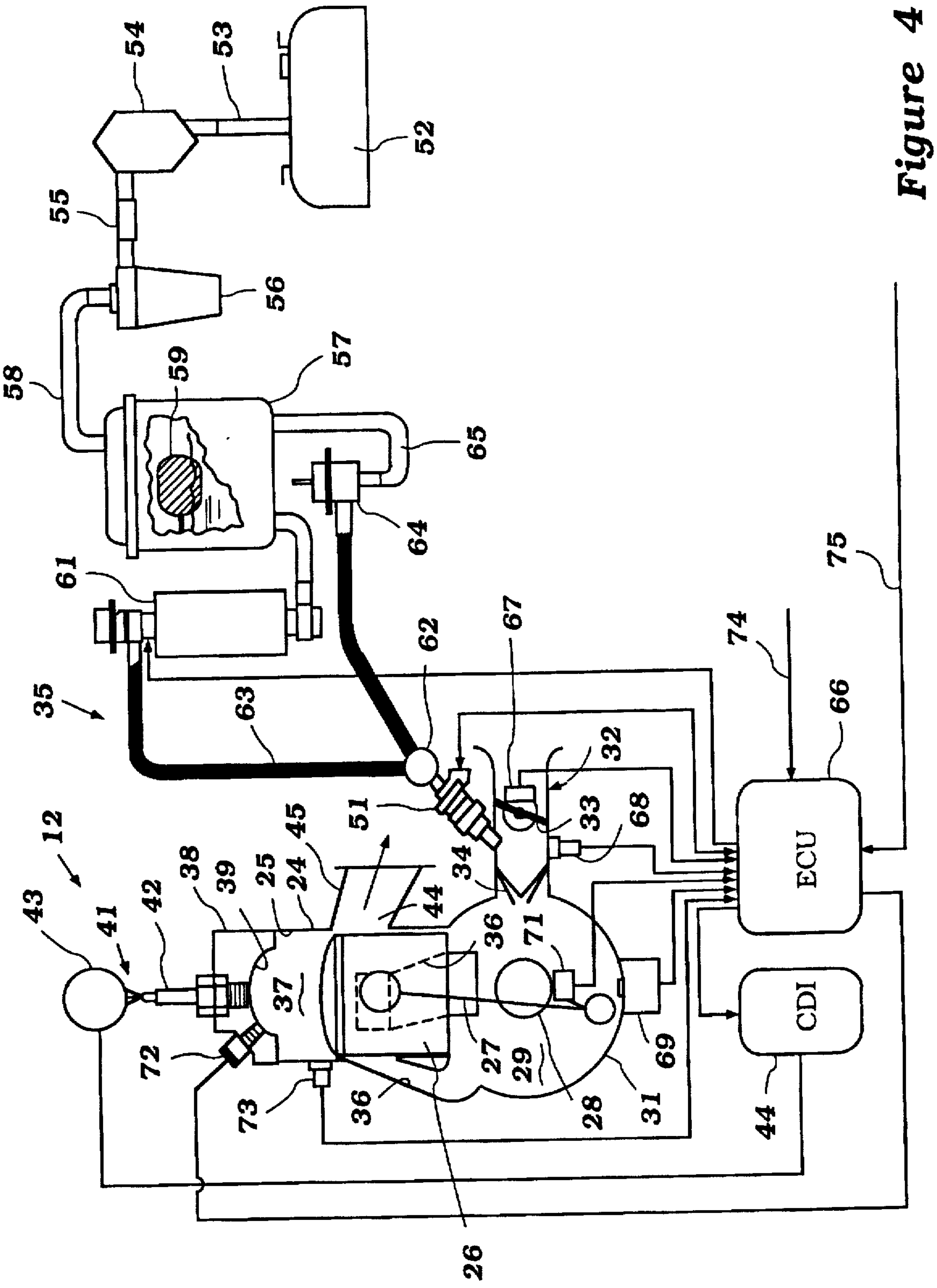
FIG. 4 is a partially schematic cross-sectional view taken through one cylinder of the engine and shows the various components of the engine and its control system in part schematically.

Referring now additionally to FIGS. 2–4 and primarily to these figures, the engine 12 and the systems associated with it are shown in more detail and, at times, schematically. In the illustrated embodiment, the engine 12 is of the three-cylinder in-line type, although it will be readily apparent to those skilled in the art how the invention may be practiced in other types of engines and engines having other cylinder numbers and other cylinder configurations.

FIG. 2, as has been noted, is a rear elevational view of the engine, with a portion broken away, while FIG. 4 is a schematic view of the engine showing one of its cylinders. Although the internal construction of the engine may be of any known type, these components will be described briefly.

The engine 12 includes a cylinder block 24 in which three aligned cylinder bores 25 are formed. In each of the cylinder bores 25 a piston 26 reciprocates. The pistons 26 are coupled by means of a connecting rods 27 to a crankshaft 28. The crankshaft 28 is thus driven by the pistons 26 through the connecting rods 27 in a manner well known in this art.

The crankshaft 28 is rotatably journaled within a crankcase chamber 29 formed by the cylinder block 24 and a crankcase member 31 that is detachably connected to it. As is well known in crankcase compression engines, the crankcase chamber 29 associated with each of the cylinder bores 25 is sealed from the others.

The engine 12 is provided with an induction system for delivering an air charge to the crankcase chambers 29. This induction system is indicated generally by the reference numeral 32 and is shown only schematically, since the actual details of it may be of any type known in the art. The induction system includes an inlet device in which a flow-controlling throttle valve 33 is provided. The throttle valve 33 is remotely controlled by an operator and controls the volume of air which can pass through the induction system 32.

This air that has passed the throttle valve 33 enters the crankcase chambers 29 through an intake manifold in which a reed type check valve 34 is positioned. This check valve 34 permits air flow into the crankcase chambers 29 when the pistons 26 are moving upwardly and precludes reverse flow when the pistons 26 move downwardly to compress the charge in the chambers 29.

In the illustrated embodiment, a fuel charge-forming system, indicated generally by the reference numeral 35, is provided for supplying fuel to the air inducted. Although the invention is described in conjunction with such a manifold injection system, it will be readily apparent to those skilled in the art that the invention may be employed with other types of charge-forming systems, including those embodying direct cylinder injection. The fuel supply System 35 will be described in more detail later.

The air charge and fuel, if any, admitted to the crankcase chambers 29 and compressed therein during the downward movement of the pistons 26 is transferred through one or more scavenge passages 36 to combustion chambers 37, which are formed in part by the cylinder bore 25 and pistons 26. In addition, a cylinder head assembly 38, shown in more detail in FIG. 2, is affixed to the cylinder block 24 in a known manner. The cylinder head 38 has individual recesses 39 which cooperate with the elements of the combustion chamber 37 thus far described to complete the combustion chamber.

The charge which has been admitted to the combustion chamber 37 is fired by means of an ignition system, indicated generally by the reference numeral 41. This ignition system includes individual spark plugs 42 mounted in the cylinder head 38 and having their gaps extending into the combustion chambers 37. In the illustrated embodiment, each spark plug 42 has associated with it a respective spark coil 43 that receives an electrical charge from a capacitor discharge ignition system (CDI) 44 for firing the spark plugs 42 in a well-known manner.

The charge will burn and expand and drive the pistons 26 downwardly. When the pistons 26 move downwardly a sufficient distance, they will open exhaust ports 44 of an exhaust system that includes an exhaust manifold 45 that is shown schematically in FIG. 4, but which is shown in actual detail in FIG. 2. The exhaust manifold 45 is formed integrally with or at least partially by the cylinder block 24 and terminates in a downwardly facing discharge end 46, shown in FIG. 3. This discharge mates with the exhaust passage of an exhaust guide 47 that is interposed between the lower end of the cylinder block 24 and the upper end of the drive shaft housing 15.

The drive shaft housing 15 is formed with an integral expansion chamber 48, to which the exhaust gases are delivered. For this purpose, an exhaust pipe 49 is affixed to the underside of the exhaust guide 47 and opens into the expansion chamber 48. The expansion of the exhaust gases in the expansion chamber 48 provides some silencing. The exhaust gases are then discharged to the atmosphere through any suitable exhaust system.

In connection with outboard motor applications, this exhaust system may include a through-the-hub underwater exhaust gas discharge formed in the propeller 17. In addition, and as is typical in this art, there may also be provided an above-the-water exhaust gas discharge for discharging the exhaust gases in an area of reduced back pressure when the outboard motor 11 is operating at a slow speed and the propeller 17 is relatively deeply submerged. These types of systems are well known in the art, and any known type of system may be employed in conjunction with the invention.

Returning now to the description of the fuel supply system 35 by particular reference to FIG. 4, a plurality of electronically actuated fuel injectors 51 are provided, each of which discharges into the throttle body or induction system downstream of the throttle valves 33. The fuel injectors are operated in a manner to be described so as to control the timing and duration of fuel injection.

Fuel is supplied to the fuel injectors 51 by the remainder of the charge-forming system 35, which includes a remotely positioned fuel tank 52 which may be positioned in the hull of an associated watercraft. A conduit 53 supplies fuel from the tank 52 to the power head, and specifically to a low-pressure fuel pump 54 which is mounted on the engine 12 and driven in any suitable manner.

The low-pressure fuel pump 54 discharges fuel through a conduit 55 to a fuel filter 56. The fuel filter 56, in turn, delivers the fuel to a vapor separator 57 through a conduit 58. The vapor separator 57 has a float-operated valve 59 that controls the level of fuel therein, and which thus provides a uniform head of fuel to a high-pressure fuel pump 61. Although the fuel pump 61 is shown schematically as an external component, the fuel pump 61 may, in fact, be contained within the vapor separator 57. The vapor separator 57 has a vent pipe (not shown) by which fuel vapors may be discharged, preferably back into the engine for further combustion therein.

The high-pressure fuel pump 61 may be electrically driven and delivers fuel to a fuel rail 62 through a conduit and/or manifold 63. The pressure in the fuel rail 62 is controlled by a pressure regulator 64, which controls the fuel pressure by dumping excess fuel back to the vapor separator 57 through a return line 65. In this way a uniform, controlled pressure source of fuel is available for the fuel injectors 51.

The controls for both the ignition system 41 and charge-forming system 35 will now be described again by primary reference to FIG. 4. Both the CDI unit 44 and the electronically controlled fuel injectors 51 are controlled by an ECU, indicated generally by the reference numeral 66. The ECU 66 receives a number of signals from both engine conditions and ambient conditions, and some of these signals will be described. It is to be understood, however, that the actual control strategy that is adopted may be of any known in this art or any other suitable type except for certain phases, as will be noted.

The invention deals with one of the sensors, the combustion sensor, and its interrelationship, which will be described later. Therefore, the sensors now to be described should be considered to be only typical sensors and systems with which the invention may be practiced. Associated with the throttle valve 33 is a throttle position sensor 67 that outputs a signal to the ECU 66, which is indicative of the operator power demand indicated by the position of the throttle valve 33. Also provided is an intake air temperature sensor 68 that is positioned in the induction system 32 downstream of the throttle valve 33.

As is well known, intake air volume in two-cycle engines may be measured accurately by measuring crankcase pressure at certain crank angles. This system is employed in the illustrated embodiment, although others may be employed, as will be apparent to those skilled in the art. Therefore, there is provided a crankcase pressure sensor 69 that senses the pressure in the crankcase chamber 29. Also, a crank angle position sensor 71 is associated with the crankshaft 28 and outputs a signal indicative of the angular position of the crankshaft 28. This signal also may be employed for controlling the timing of spark timing and the timing of fuel injection, as is well known in the art. In addition, the output of this sensor 71 with time may be employed to measure actual engine speed.

There is further provided an in-pressure cylinder pressure sensor 72 that senses the pressure in the combustion chamber 37. This signal as well as a signal from a knock sensor 73 are transmitted to the ECU 66 for its control purposes. Other signals may also be transmitted, such as a position sensor for the controller of the throttle valve 33, indicated schematically at 74, and the output of the various other signals such as intake water temperature, exhaust back pressure, output of the combustion condition sensor, to be described, and other such conditions that may effect engine performance which outputs are indicated schematically at 75.

Figure 5:
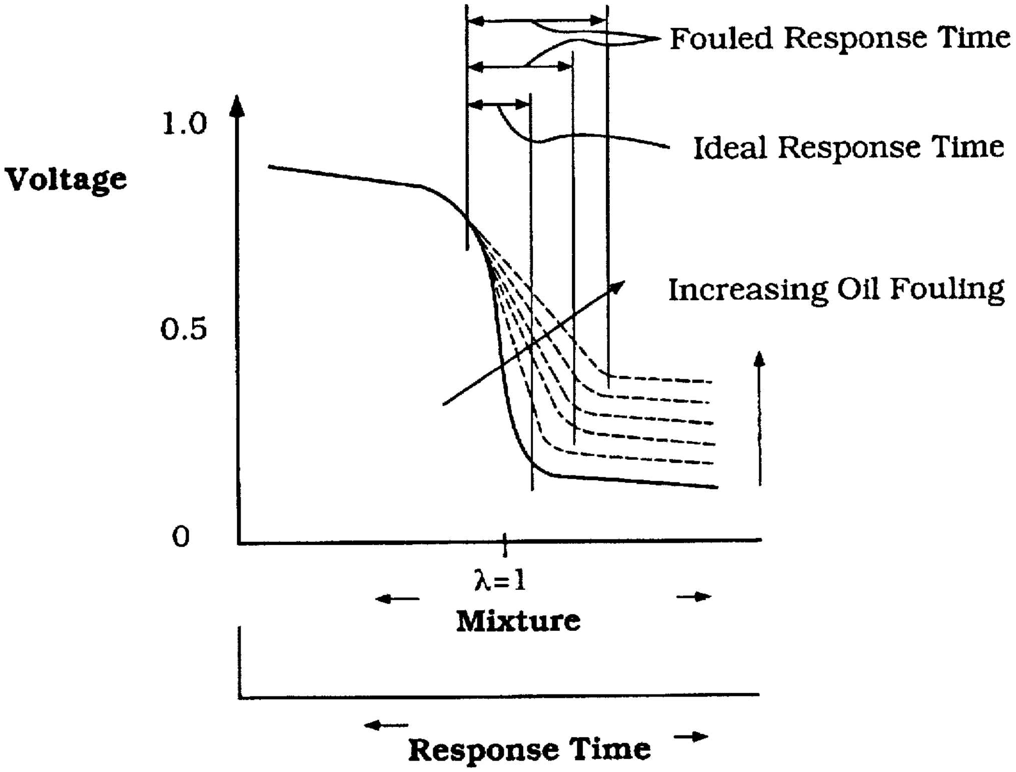
FIG. 5 is a graphical view showing the output of the combustion sensor with respect to the air/fuel mixture ratio comparing a normally operating sensor in solid lines and deteriorating or fouled sensors in broken lines.

Finally, and in accordance with the invention this combustion condition sensor is provided for sensing the actual fuel-air ratio in the combustion chamber. This sensor outputs a signal to the ECU that is employed to maintain the desired fuel-air ratio, such as a stoichiometric ratio. The sensor that performs this function is, in the illustrated embodiment, an oxygen ($O_2$) sensor that will output a signal indicating either a rich or lean mixture. This sensor is identified by the reference numeral 76 and may be positioned either in the exhaust manifold 45, as shown in FIG. 2, or in the exhaust passage formed in the exhaust guide 47, as shown in FIG. 3. In either event, the oxygen sensor 76 should be disposed in an area where it can sense the combustion products at a time when combustion has been substantially completed and before any scavenging fuel-air charge may have been mixed with the combustion products. Under some circumstances oil or other deposits mixed with the combustion exhaust gases may foul the $O_2$ sensor 76 and cause it to output an incorrect signal to the ECU 66 and thus adversely effect the engine performance as shown in FIG. 5. This Figure shows plots of the relationship between the output voltage of the $O_2$ sensor 76 with respect to the actual fuel/air ratio. The solid line in the figure corresponds to the correct signal from the $O_2$ sensor 76 for a given fuel/air ratio while the dashed lines indicate the effect of the presence of fouling oil or other deposits on the $O_2$ sensor 76 in increasing amount. As is clearly evident, for near ideal (stoichiometric) and lean fuel/air mixture ratios the presence of fouling oil on the $O_2$ sensor 76 tends to cause the sensor to indicate a richer than actual fuel/air ratio and to also delay the response time of the sensor.

The embodiments of this invention take corrective steps to prevent the effect of false $O_2$ sensor readings from adversely effecting the fuel/air mixture ratio. This is done in part by testing the sensor in several ways at varying engine rotational speeds and running conditions. In fact preferably the condition of the $O_2$ sensor is periodically compared with known or expected performance or results during the entire running of the engine 12. If the sensor is determined to be fouled or not operating properly, a form of control other than feed back control is employed.

During engine warmup, when the engine 12 has just been started and is not yet operating at the design operating temperature, the fuel/air mixture ratio is enriched until the engine 12 has warmed up. It is known that the $O_2$ sensor will not output a signal until it is at its operating temperature, and even then will not output a signal, with the lean type of sensor depicted, until the mixture goes lean.

During this warmup phase the ECU 66, after a given period of time or number of engine pulses, will test the sensor 76 by leaning out the fuel/air mixture to a known stored ratio in order to test the $O_2$ sensor 76. If the fuel/air ratio as measured and signalled to the ECU 66 by the $O_2$ sensor 76 does not correspond to the ECU's stored value for the lean condition then it is assumed that the $O_2$ sensor 76 has either been fouled or is not yet at operating temperature. Until the correct and expected signal is received the ECU 66 will control the fuel air ratio according to a map based on previously memorized values for the running and ambient conditions. This testing will be continued until such time as the $O_2$ sensor successfully signals the correct lean fuel/air ratio in a subsequent warmup test.

It should be understood that this may happen if the reason for the faulty previous readings was that the sensor 76 was not warmed up and the operating temperature was subsequently reached. Also if the reason for a faulty signal was because of fouling of the sensor, the sensor may have burned itself clear of the fouling deposits. Thus the sensor is continuously tested as the condition of the sensor may improve.

Figure 6:
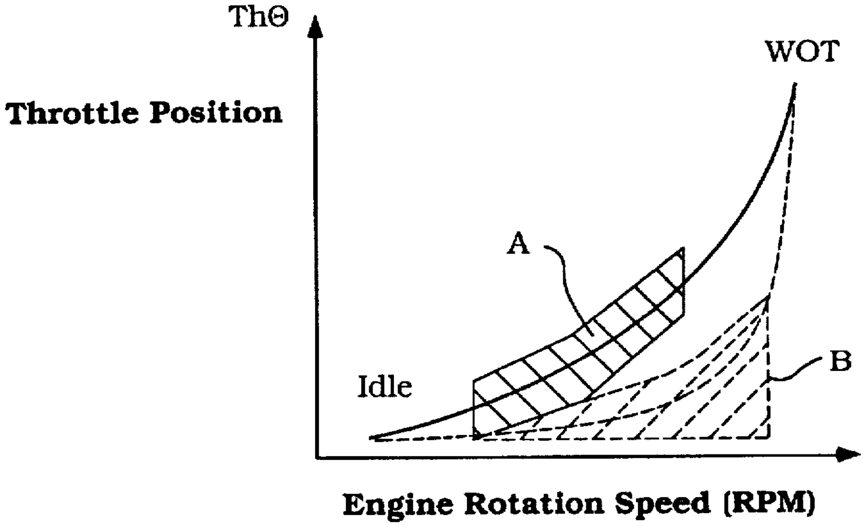
FIG. 6 is a graphical view showing the throttle position with respect to the engine rotational speed and certain control ranges in accordance with the invention.

The $O_2$ sensor continues to be periodically tested for proper operation when the engine 12 is operating in the medium engine rotational speed range represented by shaded portion A of FIG. 6, which shows the relationship of the throttle valve angular position to the engine rotational speed. In the normal course of engine operation within this area of the operating range the ECU 66 is continually varying the fuel/air mixture ratio between lean and rich settings because of the very nature of feed back control.

If during this time the $O_2$ sensor 76 continues to output a constant or substantially constant value for more than a predetermined time then the ECU 66 will again assume that the $O_2$ sensor is fouled or has failed. The ECU 66 will then discontinue feedback control and will default to an open control based on a map or maps containing the proper settings from previous data generated from the specific engine running and ambient conditions. This open control will continue until such time as the $O_2$ sensor correctly relays a lean fuel/air mixture or varying signal within the proper time frame upon subsequent testing.

The $O_2$ sensor 76 is tested for correct operation during periods in which the engine is decelerating; at which time the mixture will be leaned out or total fuel cut off is initiated by the ECU 66. The test range is the shaded portion B of the dashed line curve on FIG. 6, which shows the throttle valve angular position verses engine rotational speed for a given deceleration.

If the $O_2$ sensor 76 again fails to signal to the ECU 66 within the correct response time a lean status or a varying signal for the fuel/air mixture during deceleration, feed back control will be discontinued and mapped fuel reduction will be initiated until such time as when the sensor 76 does output the correct signal in a timely manner.

It should be readily apparent from the foregoing description that the described system and engine control method permits good feedback control at all times when the combustion condition sensor is providing an accurate signal and which provides control at other times based upon known conditions and in an effort to return the combustion condition sensor to an operative state. Of course, the foregoing description is that of preferred embodiments of the invention, and various changes and modifications may be made without departing from the spirit and scope of the invention, as defined by the appended claims.

What is claimed is:

1. An internal combustion engine control system for maintaining a desired fuel-air ratio comprised of a combustion chamber, an air induction system for delivering at least an air charge to said combustion chamber, a charge-forming system for supplying at least a fuel charge to said combustion chamber, an exhaust system for discharging combustion products from said combustion chamber, it combustion condition sensor for sensing the fuel-air ratio in said combustion chamber, a feedback control for receiving the output of said combustion condition sensor and adjusting at least one of said charge-forming and induction systems to maintain the desired fuel-air ratio, and testing means for comparing the output of said combustion condition sensor periodically under all engine running conditions to determine if said combustion condition sensor is providing an accurate signal, said testing means employing one method of testing during one type of running phase of said engine and another method of testing during another type of running phase of the engine.

2. An internal combustion engine control system as in claim 1, wherein the one running phase is idle.

3. An internal combustion engine control system as in claim 2, wherein the other running phase comprises a steady-state off-idle running condition.

4. An internal combustion engine control system as in claim 1, wherein in the one method of testing the sensor is determined to be in error if the sensor signal does not vary by more than a predetermined amount within a predetermined time period during steady-state running.

5. An internal combustion engine control system as in claim 1, wherein in one method of testing the output of the combustion condition sensor is sensed at succeeding time intervals when the same running condition prevails to determine if the combustion condition sensor is providing an accurate signal.

6. An internal combustion engine control system as in claim 5, wherein the combustion condition sensor is determined to be inaccurate if the successive testings provide a signal of constant or substantially constant value.

7. An internal combustion engine control system as in claim 1, wherein the method of controlling the fuel-air ratio is changed in the event the sensor is determined to be providing an inaccurate signal.

8. An internal combustion engine control system as in claim 7, wherein the condition of the sensor continues to be checked during the open control method and feedback control is returned if the combustion condition sensor again outputs an accurate signal.

* * * * *